(12) United States Patent
Laukemann

(10) Patent No.: US 9,677,634 B2
(45) Date of Patent: Jun. 13, 2017

(54) HYDRODYNAMIC RETARDER

(71) Applicant: Voith Patent GmbH, Heidenheim (DE)

(72) Inventor: Dieter Laukemann, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 465 days.

(21) Appl. No.: 14/236,318

(22) PCT Filed: Feb. 4, 2013

(86) PCT No.: PCT/EP2013/052130
§ 371 (c)(1),
(2) Date: Oct. 17, 2014

(87) PCT Pub. No.: WO2013/113919
PCT Pub. Date: Aug. 8, 2013

(65) Prior Publication Data
US 2015/0292581 A1  Oct. 15, 2015

(30) Foreign Application Priority Data
Feb. 3, 2012 (DE) .......................... 10 2012 002 038

(51) Int. Cl.
*F16D 57/00* (2006.01)
*F16D 65/78* (2006.01)
(Continued)

(52) U.S. Cl.
CPC ............ *F16D 65/78* (2013.01); *B22D 18/00* (2013.01); *B60T 1/087* (2013.01); *B60T 10/02* (2013.01); *F16D 57/04* (2013.01)

(58) Field of Classification Search
CPC ... B60T 1/087; F16D 7/00; F16D 7/04; F16D 7/06
(Continued)

(56) References Cited

U.S. PATENT DOCUMENTS 3,396,825 A    8/1968 Ruckert
3,958,671 A *  5/1976 Muller .................... B60T 1/087
                                                    188/274
(Continued)

FOREIGN PATENT DOCUMENTS

CN    1720160 A   1/2006
CN    101980906 A  2/2011
(Continued)

OTHER PUBLICATIONS

English Translation of PCT International Preliminary Report on Patentability dated Aug. 5, 2014 in PCT Application No. PCT/EP2013/052130.

*Primary Examiner* — Edelmira Bosques
*Assistant Examiner* — Dustin T Nguyen
(74) *Attorney, Agent, or Firm* — Farjami & Farjami LLP

(57) ABSTRACT

The invention relates to a hydrodynamic retarder comprising—a rotor (1) and a stator (2) which form a working chamber (3) with each other;—a first working medium connection (6);—a second working medium connection (7); and—a working medium container (4) that has an outlet (10), which is connected to the first working medium connection via a line, and an inlet (11), which is connected to the second working medium connection via a line; wherein—the working medium container is made of two housing parts (8, 9), which are joined together along a parting line (12). According to the invention:—the two housing parts together enclose the working medium storage volume;—one of the two housing parts simultaneously forms a part of a retarder housing (14) which supports or forms the stator and partly forms all or some of the working medium-conducting connections between the working medium storage volume and the working chamber; and—a separating plate (13) is inserted between, the two housing parts, said separating plate together with one or both of the (Continued)

housing parts forming cavities for the working medium-conducting connections and/or the working medium storage volume.

20 Claims, 3 Drawing Sheets

(51) Int. Cl.
    *F16D 57/04*    (2006.01)
    *B60T 10/02*    (2006.01)
    *B22D 18/00*    (2006.01)
    *B60T 1/087*    (2006.01)

(58) Field of Classification Search
    USPC .......................... 60/364; 188/290, 296, 274
    See application file for complete search history.

(56) References Cited

U.S. PATENT DOCUMENTS 4,043,434 A * 8/1977 Braschler ............... F16D 57/04
                                                              188/296

4,191,072 A * 3/1980 Ehrlinger ............... B60T 1/087
                                                              192/221

5,333,707 A * 8/1994 Kaneda .................. B60T 1/087
                                                              188/290

FOREIGN PATENT DOCUMENTS

| DE | 1 805 329 | 4/1970 |
| --- | --- | --- |
| DE | 2 106 931 | 8/1972 |
| DE | 2 238 726 | 2/1974 |
| DE | 28 11 171 | 9/1978 |
| DE | 30 21 483 | 1/1981 |
| DE | 35 45 658 | 6/1987 |
| DE | 39 30 540 | 3/1990 |
| DE | 44 42 219 | 6/1995 |
| DE | 696 08 592 | 9/2000 |
| DE | 603 00 355 | 12/2005 |

\* cited by examiner

HYDRODYNAMIC RETARDER

This is a U.S. national phase application, which is based on, and claims priority from, PCT application Serial No. PCT/EP2013/052130, filed Feb. 4, 2013, which claims priority from foreign application Serial No. 10 2012 002 038.4, filed Feb. 3, 2012, in Germany.

The present invention concerns a hydrodynamic retarder in detail according to the preamble of claim 1. The present invention relates moreover to a method for manufacturing such a retarder.

Hydrodynamic retarders comprise a working chamber which can be filled with a working medium and emptied thereof, to transmit a torque from a bladed primary wheel, also called rotor, to a secondary wheel, also called stator. When the working chamber is filled, the primary wheel and hence a shaft in particular connected fixedly to the primary wheel, for example a transmission output shaft or a joint shaft connected indirectly to the wheels of a vehicle is delayed.

Hydrodynamic retarders have conventionally cooled by an external oil or water cooling circuit, in order to discharge therefrom the heat generated in braking mode. To do so, the working medium does not remain permanently inside the hydrodynamic retarder, by way of example in a working chamber or in a storage chamber, also called delay chamber, but on the contrary is supplied to an external cooling circuit. A working medium container is provided in the latter for accommodating working medium which is not situated in the working chamber at the time. The hydrodynamic retarder comprises thereby a first working medium connection for feeding working medium into the working chamber and a second working medium connection for discharging the same therefrom. The working medium container comprises an outlet which is connected to the first working medium connection for filling the working chamber via the external cooling circuit and an inlet for discharging working medium from the working chamber, which is connected to the second working medium connection via the external cooling circuit. Consequently, working medium can be conveyed from the working medium container into the hydrodynamic retarder or its working chamber and then supplied from the working chamber or the hydrodynamic retarder via the external cooling circuit back into the working medium container.

Conventionally, such working medium containers are obtained from different housing parts in the sand casting process and connected to the retarder housing which is also produced from several parts in the sand casting process. The housing parts contain channels for conveying working medium which are formed by inserting cores into the sand casting mold, which are destroyed after the casting process. The shortcoming of it is the considerable production and the resulting costs of such retarders with working medium container.

DE 1 805 329 describes a hydrodynamic brake with a stator housing which forms simultaneously an inlet for working medium into the working chamber. To do so, a rotor as well as a stator of the hydrodynamic brake in radial direction are situated opposite to each other inside the housing.

The object of the present invention is then to provide a hydrodynamic retarder, which avoids the shortcomings above mentioned. A hydrodynamic retarder should in particular be provided with a working medium container which enables to reduce the amount of production and the resulting cost of production.

The object according to the invention is solved by a hydrodynamic retarder according to the independent claim. Advantageous and particularly appropriate embodiments of the invention are disclosed in the dependent claims. A method of production of the retarder is also specified.

A hydrodynamic retarder according to the invention comprises a bladed rotor and a bladed stator which form together a working chamber which can be filled with working medium and emptied thereof, with at least a first working medium connection for feeding working medium into the working chamber and a second working medium connection for discharging the same therefrom. A working medium container is further provided which defines a working medium storage volume for accommodating working medium which is not situated in the working chamber at that time, whereas the working medium container comprises an outlet, which is connected via at least one line to the first working medium connection for conveying the working medium, and moreover one inlet which is connected via at least one line to the second working medium connection for conveying the working medium. The working medium container consists of at least two housing parts which are assembled along at least one parting line.

Both housing parts enclose together the working medium storage volume and in particular additional lines or connections which are used for conveying the working medium between the working chamber and the working medium storage volume, between the working medium and a heat exchanger for cooling the working medium and/or between the working medium storage volume and the heat exchanger.

At least one of both housing parts forms simultaneously a portion of a retarder housing which carries the stator or forms the said partially or completely and forms all the connection for conveying the working fluid, or a portion of the latter, between the working medium storage volume and the working chamber at least partially or completely.

According to the invention, a separating plate is inserted between both housing parts, which plate forms, together with one or both housing parts, cavities for the working medium-conducting connections and/or the working medium storage volume. In the sense of the present invention, inserted means that the separating plate is produced separately with respect to both housing parts and for example is laid loose on one of the housing parts when assembling and when the assembly of the hydrodynamic retarder has been completed is held preferably only by clamping both housing parts against one another in their position. After such a positive-locking fit, the separating plate can be fixed after insertion between both housing parts also firmly bonded or in a friction locking manner to at least one of the housing parts, if required.

According to an embodiment, the parting line runs essentially or completely vertical in mounting position of the hydrodynamic retarder. In mounting position, the rotational axis of the hydrodynamic retarder, around which for example the rotor revolves, is normally situated in horizontal position. The parting line thus runs on a plane which is perpendicular or more or less perpendicular on the rotational axis of the hydrodynamic retarder.

The rotor and the stator of the hydrodynamic retarder are preferably opposite to each other in axial direction.

Both housing parts can be in the form of shells.

Preferably, the housing parts are obtained by casting, in particular in a single working step, a single tool and/or a single machine. This enables to have a particularly rational manufacture whereby the production cost and the amount of production are considerably reduced.

The housing parts can be produced in a pressure casting process whereas now no cores need to be used any more since the cavities for feeding or accommodating the working medium are limited together by the housing parts of the working medium container.

If the retarder comprises a heat exchanger for cooling the working medium one of both housing parts can then, i.e. usually the other so called housing part, that is to say the one which does not constitute the retarder housing simultaneously or both housing parts of the working medium container can produce at least one, several or all working medium-conducting connections between the working chamber and a heat exchanger inlet of the heat exchange and/or at least one connection for conveying the working medium, several connections or all the connections between a heat exchanger outlet of the heat exchanger and the working medium storage volume.

There is another advantage when the heat exchanger is connected to the other housing part from the outside and in particular is carried by said housing part.

An embodiment according to the invention provides sets forth that one of both housing parts, in particular the other housing part, which sits opposite a housing part forming a portion of the retarder housing, forms at least one connection for a control pressure application system and at least one line for a control pressure medium for operating the working medium storage volume with a control pressure. It is advantageous if a working medium separator is provided in said at least one line for the control pressure medium. The working medium separator can advantageously consist of one or both housing parts or be inserted into a housing part or both housing parts of the working medium container.

An embodiment provides that the retarder housing comprises in addition to the one formed of a housing part of the working medium container at least one second portion which is connected to one of both housing parts of the working medium container and encloses the rotor. The retarder housing in particular is composed of both these portions.

At least one seal can be inserted between the housing parts of the working medium container for sealing individual cavities relative to one another.

Such a seal can for instance be in the form of the separating plate.

A method according to the invention sets forth that a retarder of the type previously described, which is formed close to the working chamber by the so-called circuit parts (rotor and stator), comprises a working medium container for accommodating the working medium storage volume by forming both housing parts of the working medium container and in particular the portions of the retarder housing in a pressure casting process, for example of aluminum or an aluminum alloy.

Although in the present instance it has always been shown that the working medium container consists of two, in particular exactly of two housing parts, there can be more housing parts.

The invention should now be described in an embodiment using the accompanying figures.

Figure 1:
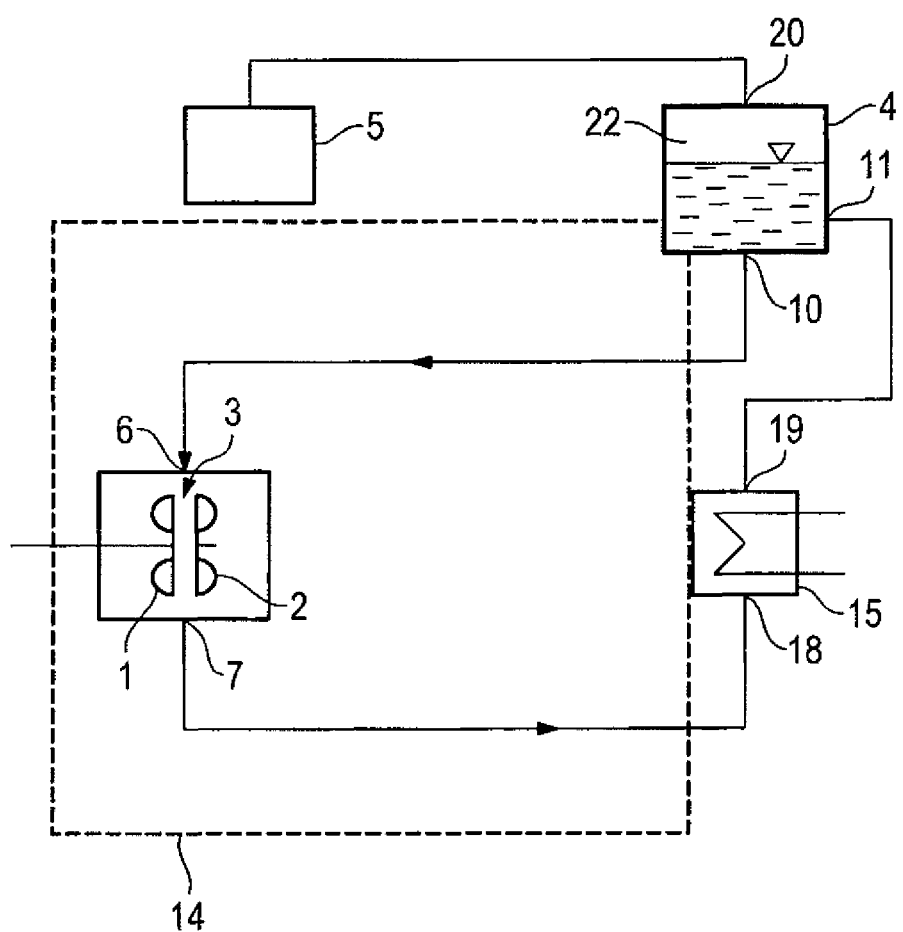
FIG. 1 shows a diagrammatical illustration of a hydrodynamic retarder arranged in an external cooling circuit.

FIG. 1 shows a diagrammatical illustration of a hydrodynamic retarder arranged in an external cooling circuit. The latter includes a bladed and rotating primary wheel, designated as rotor 1, as well as a stationary, non-rotating and also bladed secondary wheel, designated as stator 2. Rotor 1 and stator 2 form together a toroidal working chamber 3. Moreover, a working medium container 4 is provided for supplying working medium which at the time is not situated in the working chamber 3. The working medium can be oil, water or an aqueous mixture. The external cooling circuit represented can be simultaneously a cooling circuit of a vehicle such as a utility vehicle or a track vehicle so that the cooling medium of the cooling circuit is simultaneously the working medium of the hydrodynamic retarder.

The working medium container 4 comprises an outlet 10 which is connected via a flow directing connection to a first working medium connection for conveying working medium from the working medium container 4 into the working chamber 3 of the hydrodynamic retarder. For evacuating working medium from the working chamber 3, the hydrodynamic retarder encloses a second working medium connection 7 which is connected in a flow-guiding manner to an inlet 11 of the working medium container 4.

A heat exchanger 15 is arranged in the cooling circuit as seen in the flow direction of the working medium behind the hydrodynamic retarder for evacuating heat from the working medium. The heat exchanger 15 can be designed as an oil-water-heat exchanger as regards the working medium oil and be connected to a non-represented cooling circuit of a vehicle for evacuating heat from the working medium in a heat transferring manner. The heat exchanger 15 includes a heat exchanger inlet 18 and a heat exchanger outlet 19 and is situated between the second working medium connection 7 and the inlet 11 of the working medium container 4.

The working chamber 3 can be filled with working medium and be emptied thereof, which circulates in the external cooling circuit. The working chamber 3 can be filled by applying a pressurized control pressure to the working medium situated in the working medium container 4. The emptying takes place by releasing this pressurization. The working medium container 4 is partially filled with working medium, for instance oil and partially with control pressure medium, such as air so that a liquid level of the working medium separates the control pressure medium side from the working medium side. There could also be a separation via a piston or a membrane. A (single) flow-guiding connection is provided between the working medium container 4 and a control pressure application system 5 for pressurizing the liquid level. The flow-guiding connection forms here an inlet and simultaneously an outlet for the control pressure medium which flows into or out of the working medium container 4.

Also, an additional connection line arranged parallel to the flow-guiding connection could be provided between the control pressure application system 5 and the working medium container 4. In such a case, the additional connection line serves to pressurize, i.e. to feed control pressure medium from the control pressure application system 5 via an inlet to the working medium container 4 and the flow-guiding connection represented for evacuating the control pressure medium from the working medium container 4 via the outlet.

As indicated by the dotted lines, the hydrodynamic retarder, more precisely the rotor 1 as well as the stator 2, is enclosed by a retarder housing 14. The working medium container 4 and/or the heat exchanger 15 can be fastened thereto. The retarder housing 14 can, as represented, enclose or form the working medium connections 6, 7 and the lines leading thereto.

Figure 3:
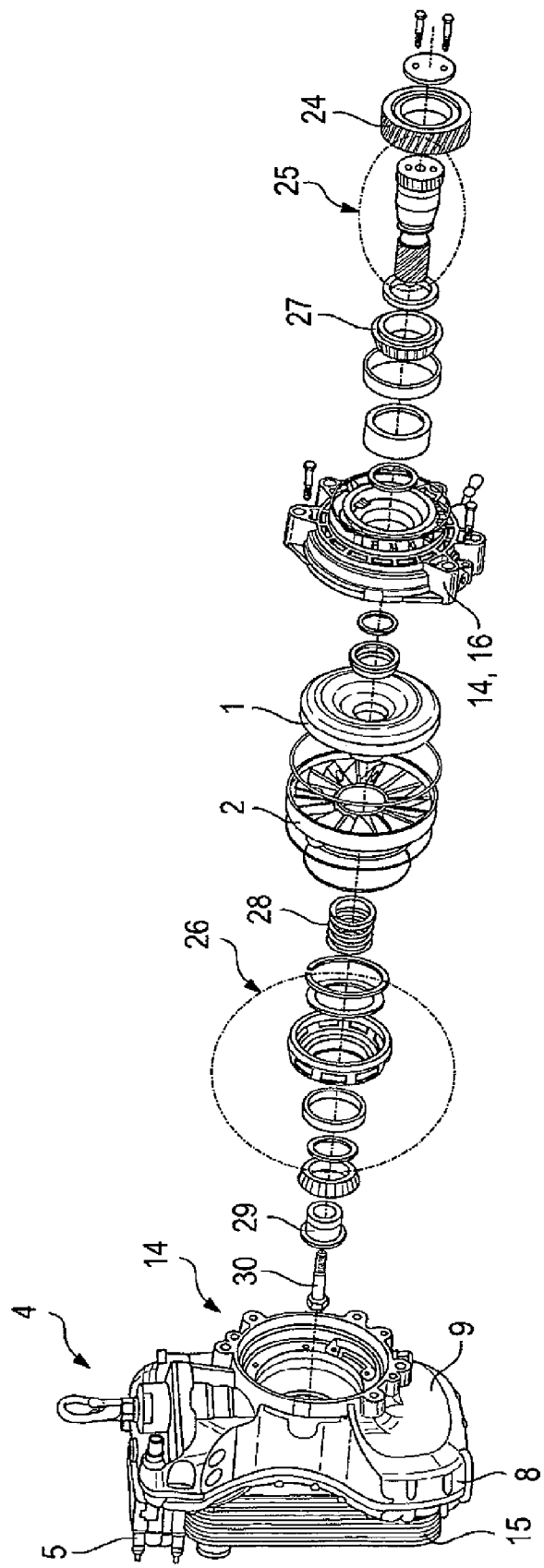
FIG. 3 shows the form of embodiment in another exploded view.

FIG. 3 represents an embodiment of the working medium container 4 in an exploded view. In the present case, the working medium container 4 is composed of two housing parts 8, 9 along a parting line 12. The front sides of the housing parts 8, 9 facing one another are flush in the present case and lay in a common separation plane 12.1 here individual and in assembled condition. This should however not be the case the parting line 12 could also include protrusions and/or retractions.

The parting line runs in such a way through all cavities formed of both housing parts 8, 9 that there are no cavities closed up outwardly which are not accessible from the parting line 12. Advantageously, there are no undercuts, from the parting line 12. This does not preclude that cavities accessible from the outside are provided on the front side facing away from the parting line 12 or on the periphery of the individual housing parts 8, 9 by way of example to form connections or fines. This enables to produce the housing parts 8, 9 in a pressure casting process, for instance in an aluminum pressure casting process, without lost cores.

A separating plate 13 is inserted between both housing parts 8, 9 which also runs inside or parallel to the parting line 12 or the separation plane 12.1. The separating plate 13 can together with one or both housing parts 8, 9 form corresponding cavities for accommodating or conveying working medium. It can have openings to connect specific cavities of the housing part 8 with the other housing part 9 or to prevent a flow-guiding connection between the housing parts 8, 9 and to block the latter according to a seal relative to one another. By cavities are meant the cavities or channels for the working medium-conducting connections and/or the working medium storage volume. They are limited accordingly together from the separating plate and said at least one housing part 8, 9. The separating plate 13 can be connected via corresponding bores with one or both housing parts 8, 9, for instance by pins or screws. More than one separating plate 13 can be provided.

The working medium container 4 assembled of two housing parts 8, 9 surrounds the working medium storage volume 17 as well as the control pressure medium 22, for instance air chamber, which corresponds to the control pressure medium 22 in FIG. 1 and through which the working medium can be acted upon in the working medium storage volume 17 more or less with a control pressure in order to displace said working medium more or less into the working chamber of the retarder.

The first housing part 8 of the working medium container 4, which faces away from the rotor 1 and the stator 2 of the retarder moreover forms lines 23 and connections (non-detectable) for the control pressure medium as well as a working medium separator 21, here formed of two cyclone separators arranged in series. The second housing part 9 can naturally contribute to the formation of these structural element or cover the corresponding chambers in the first housing part 8.

Moreover, the first housing part 8 carries the heat exchanger 15 and forms the connection lines leading thereto. These are designated with the same reference signs as in FIG. 1. Thus, the first housing part 8 provides the connection from the working medium storage volume 17 to the heat exchanger outlet 19 whereas the inlet into the working medium container 4 or the working medium storage volume 17 and the heat exchanger outlet 19 coincide via the selected form of embodiment, because it is formed only by an opening in the front-sided side of the first housing part 8. The first housing part 8 moreover forms the outlet 10 from the working medium container 4 or the working medium storage volume 17, see the transition from the working medium storage volume 17 into a cylindrical chamber, which is opened in the parting line 12 between both housing parts 8, 9 and is closed on the front side of the first housing part 8 facing away from said chamber.

The second housing part 9 connects said cylindrical chamber of the first housing part 8 which comprises the outlet, to the stator 2 of the retarder, via which the working medium supply is continued further into the working chamber (non-detectable) of the retarder.

Figure 2:
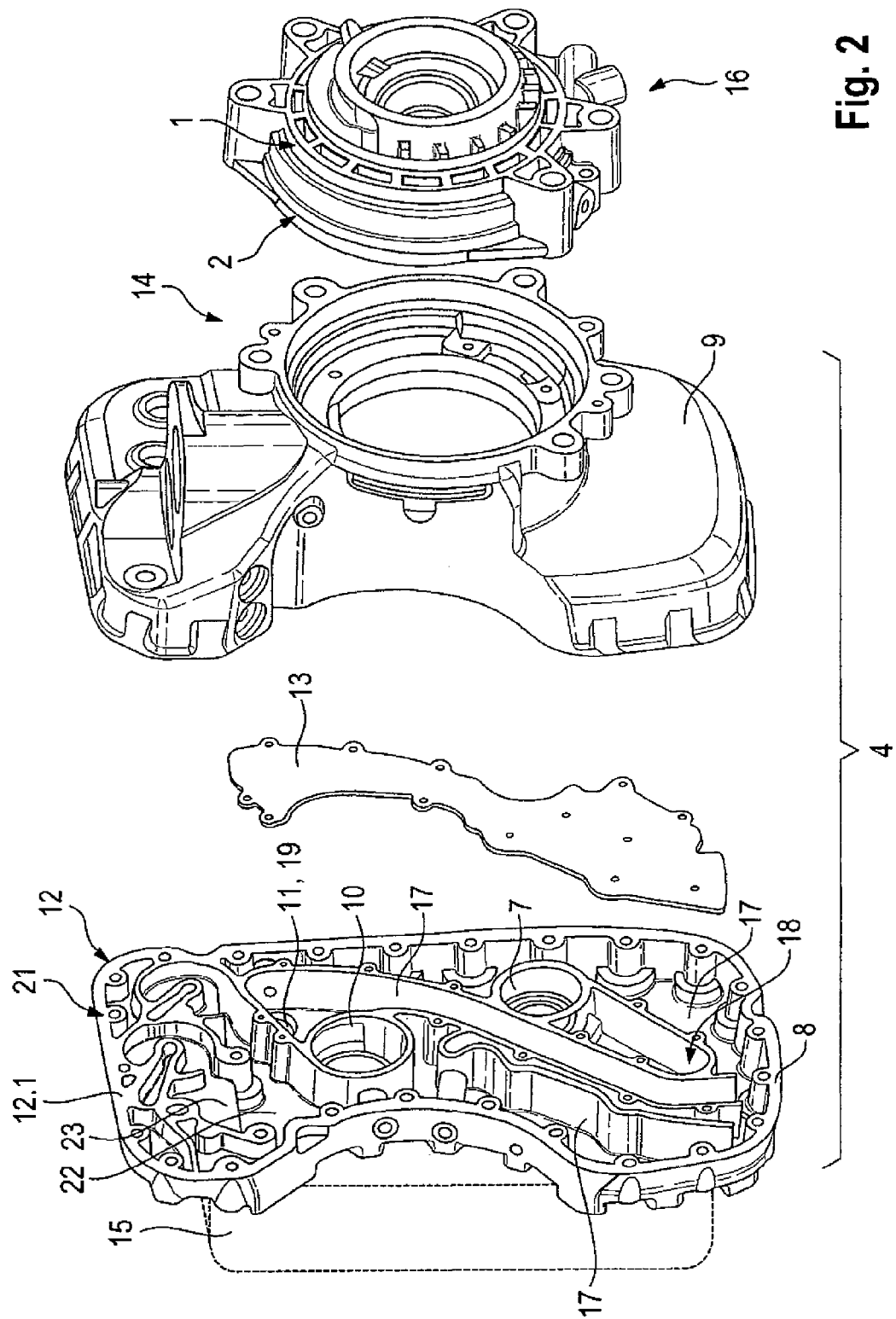
FIG. 2 shows a preferred embodiment of a working medium container of the hydrodynamic retarder.

The second housing part 9 of the working medium container 4 forms at the same time a first portion of the retarder housing 14, which encloses the stator 2 (non-detectable in detail in FIG. 2) and to which is connected a second portion of the retarder housing 14, designated here as rotor housing 16 because it encloses the rotor 1, in particular by screwing.

A separating plate 13 is inserted between both housing parts 8, 9 which separates selected cavities of the first housing part 8 from cavities in the second housing part 9. Other cavities conversely are formed together through the first housing part 8 and the second housing part 9.

In FIG. 3, the heat exchanger connected to the first housing part 8 of the working medium container 4 can be seen once again. Moreover, the control pressure application system 5 connected to the same front side of the first housing part 8.

On the front side of the second housing part 9 facing away conversely, the connection or the inclusion of the circuit parts of the retarder is illustrated in exploded view. These comprise the rotor 1 and the stator 2. The stator 2 is inserted in the portion of the retarder housing 14 which is formed through the second housing part 9 of the working medium container 4. The rotor 1 is surrounded by the rotor housing 16 which is flanged to the second housing part 9. The rotor 1 is driven by an advantageously obliquely toothed pinion 24 which is positioned on the end of the rotor shaft 25 facing away from the stator 1 or the working medium container 4. The rotor shaft 25 is mounted via a first bearing between a working medium storage volume 17 and the stator 2, which is carried by the stator 2 mounted in the second housing part 9 and indirectly by the second housing part 9 and further on the opposite axial end via a second bearing 27, which is advantageously positioned in such a way that the pinion 24 is mounted cantilevered on the rotor shaft 25. This is however not strictly necessary.

A compression spring 28 is positioned on the rotor shaft 25, which spring releases the rotor 1 from the stator 2 in non-braking mode. The compression spring 28 can abut on the one hand against on the rotor 1 and on the other hand against the first bearing 26, the retarder housing 14 (advantageously the portion, which is formed via the second housing part 9) or the second housing part 9. In a particularly advantageous embodiment, a screwed-on counter-bearing 29 is provided on the rotor shaft 25, a bearing which absorbs the pressure forces of the compression spring 28. In this instance, the counter-bearing 29 is screwed with a single screw 30 frontally on the rotor shaft 26.

LIST OF REFERENCE SIGNS

1 Rotor
2 Stator
3 Working chamber

4 Working medium container
5 Control pressure application system
6,7 Working medium connection
8,9 Housing part
10 Outlet
11 Inlet
12 Parting line
12.1 Separation plane
13 Separating plate
14 Retarder housing
15 Heat exchanger
16 Rotor housing
17 Working medium storage volume
18 Heat exchanger inlet
19 Heat exchanger outlet
20 Connection for control pressure application system
21 Working medium separator
22 Control pressure medium chamber
23 Pipes for control pressure medium
24 Pinion
25 Rotor shaft
26 First bearing
27 Second bearing
28 Compression spring
29 Counterbearing
30 Screw

The invention claimed is:

1. A hydrodynamic retarder comprising:
a bladed rotor and a bladed stator, which form together a working chamber which can be filled with working medium and emptied thereof;
at least one first working medium connection for feeding working medium into the working chamber; and a second working medium connection for discharging working medium from the working chamber;
a working medium container, which limits a working medium storage volume for accommodating working medium which is not situated in the working chamber at that time, whereas the working medium container comprises an outlet, which is connected via at least one line to the first working medium connection for conveying the working medium, and moreover one inlet, which is connected via at least one line to the second working medium connection for conveying the working medium; and
wherein the working medium container consists of at least two housing parts, which are assembled along at least one parting line;
wherein the at least two housing parts enclose the working medium storage volume, the at least two housing parts including a first housing part and a second housing part;
wherein the first housing part forms simultaneously a portion of a retarder housing, wherein the retarder housing comprises a plurality of parts and carries the stator and forms all or a portion of the connection for conveying the working fluid between the working medium storage volume and the working chamber at least partially;
wherein a separating plate is inserted between the first housing part and the second housing part, wherein the separating plate forms one or more cavities with the at least two housing parts for the working medium-conducting connections and/or the working medium storage volume.

2. The hydrodynamic retarder according to claim 1, wherein the retarder comprises a heat exchanger, and wherein one or more of the at least two housing parts form a connection for conveying the working medium between the working chamber and a heat exchanger inlet of the heat exchanger and/or form a connection for conveying the working medium between a heat exchanger outlet of the heat exchanger and the working medium storage volume.

3. The hydrodynamic retarder according to claim 2, wherein the heat exchanger is connected to the one or more of the at least two housing parts from the outside and in particular is carried by the one or more of the at least two housing parts.

4. The hydrodynamic retarder according to claim 3, wherein one of the at least two housing parts forms at least a connection for a control pressure application system and at least one line for a control pressure medium for operating the working medium storage volume with a control pressure.

5. The hydrodynamic retarder according to claim 4, wherein a working medium separator, formed by one of the at least two housing parts or inserted in said one of the at least two housing parts, is provided in said at least one line for the control pressure medium.

6. The hydrodynamic retarder according to claim 2, wherein one of the at least two housing parts forms at least a connection for a control pressure application system and at least one line for a control pressure medium for operating the working medium storage volume with a control pressure.

7. The hydrodynamic retarder according to claim 6, wherein a working medium separator, formed by one of the at least two housing parts or inserted in said one of the at least two housing parts, is provided in said at least one line for the control pressure medium.

8. The hydrodynamic retarder according to claim 2, wherein the retarder housing comprises at least one second portion connected to one of the at least two housing parts, which encloses the rotor.

9. The hydrodynamic retarder according to claim 2, wherein at least one seal is mounted between the first housing part and the second housing part, for sealing individual cavities relative to one another.

10. The hydrodynamic retarder according to claim 9, wherein the separating plate comprises said at least one seal.

11. The hydrodynamic retarder according to claim 1, wherein one of the at least two housing parts forms at least a connection for a control pressure application system and at least one line for a control pressure medium for operating the working medium storage volume with a control pressure.

12. The hydrodynamic retarder according to claim 11, wherein a working medium separator, formed by one of the at least two housing parts or inserted in said one of the at least two housing parts, is provided in said at least one line for the control pressure medium.

13. The hydrodynamic retarder according to claim 1, wherein the retarder housing comprises at least one second portion connected to one of the at least two housing parts, which encloses the rotor.

14. The hydrodynamic retarder according to claim 1, wherein at least one seal is mounted between the first housing part and the second housing part, for sealing individual cavities relative to one another.

15. The hydrodynamic retarder according to claim 14, wherein the separating plate comprises said at least one seal.

16. The hydrodynamic retarder according to claim 1, wherein the parting line runs more or less vertically in mounting position of the hydrodynamic retarder and/or is arranged exclusively in a separation plane, which runs vertically and in particular the separating plate also runs inside or parallel to the parting line or to the separation plane.

17. The hydrodynamic retarder according to claim 1, wherein the at least two housing parts are obtained by casting, in particular in a single working step, a single tool and/or a single machine.

18. The hydrodynamic retarder according to claim 1, wherein the at least two housing parts are produced in a pressure casting process, in particular of aluminum or an aluminum alloy.

19. A method for manufacturing the hydrodynamic retarder according to claim 1, the method comprising: producing the first housing part and the second housing part of the working medium container in a pressure casting process.

20. The method according to claim 19 further comprising: producing the plurality of parts of the retarder housing in the pressure casting process.

* * * * *